United States Patent [19]

Church

[11] Patent Number: 5,432,317
[45] Date of Patent: Jul. 11, 1995

[54] PROJECTED DROP TRANSFER WELDING PROCESS

[76] Inventor: John G. Church, 52 Michelangelo Blvd., Brampton, Ontario, Canada, L6Z 3Z8

[21] Appl. No.: 74,399

[22] Filed: Jun. 10, 1993

[51] Int. Cl.⁶ .............................................. B23K 9/09
[52] U.S. Cl. ......................... 219/137 PS; 219/130.51
[58] Field of Search ................. 219/137 PS, 130.51, 219/74, 137 R

[56] References Cited

U.S. PATENT DOCUMENTS

| | | | |
|---|---|---|---|
| 3,475,586 | 10/1969 | Normando et al. | 219/130.51 |
| 3,995,138 | 11/1976 | Kaley et al. | 219/130.51 |
| 4,188,526 | 2/1980 | Asano | 219/137 R |
| 4,301,355 | 11/1981 | Kimbrough et al. | 219/130.51 |
| 4,463,243 | 7/1984 | Church | 219/130.51 |
| 4,464,560 | 8/1984 | Church et al. | 219/74 |
| 4,497,997 | 2/1985 | Bodewig | 219/130.51 |
| 4,529,863 | 7/1985 | Lebel | 219/74 |
| 4,572,942 | 2/1986 | Church | 219/137.42 |
| 4,794,232 | 12/1988 | Kimbrough et al. | 219/130.51 |
| 4,843,210 | 6/1989 | Church | 219/74 |
| 4,866,246 | 9/1989 | Church | 219/74 |

Primary Examiner—Clifford C. Shaw
Attorney, Agent, or Firm—Harness, Dickey & Pierce

[57] ABSTRACT

Increasing the rate of deposition of the molten metal droplets formed on the end of a wire electrode used in a gas-metal-arc welding process by advancing the electrode towards the weld deposit pool during the formation of a molten metal droplet on the end of the electrode, and applying a normal level of current to the electrode. The electrical level is momentarily substantially increased at a time when the individual droplet is almost ready to melt off the end of the electrode for free-flight transfer to the weld deposit pool. The momentarily applied increased current melts off the electrode drop prematurely so that the drop is propelled to the pool. Therefore, although smaller drops are produced than in the normal shielded gas, plasma-type, are welding process, the rate of drop formation and the more rapid separation of the drops and positive propulsion of the drops to the pool, results in substantially increased molten metal deposition in the weld pool.

4 Claims, 2 Drawing Sheets

STEP 1  STEP 2  STEP 3  STEP 4

PROJECTED DROP TRANSFER WELDING PROCESS

BACKGROUND OF INVENTION

This invention relates to an improvement in a gas-metal-arc welding process by which the rate of metal deposition is increased. This process involves feeding a consumable electrode wire towards the weld deposit pool while a shielding gas is flowed around the end of the electrode and the arc gap between the electrode and the deposit pool. The shielding gas may comprise a mixture of major proportions of argon and helium and minor proportions of carbon dioxide and oxygen. The arc ionizes the gas to form a plasma field in the arc gap. Large droplets or globules are melted, one by one, from the free end of the wire electrode and are transferred by free-flight across the arc gap to the weld deposit pool located on a substrate.

My U.S. Pat. No. 4,463,243, issued Jul. 31, 1984, for a "Welding System" describes the welding process and the shielding gas mixture. The process is further described in my U.S. Pat. No. 4,866,246, issued Sep. 12, 1989, for a "High Rate Deposition Gas-Metal-Arc Welding Process" and, in U.S. Pat. No. 4,843,210, issued Jun. 27, 1989, for a "Downward Gas-Metal-Arc Welding Process" and, U.S. Pat. No. 4,572,942, issued Feb. 25, 1986, for a "Gas-Metal-Arc Welding Process."

The process may be performed by utilizing a welding gun such as that disclosed in U.S. Pat. No. 4,464,560, issued Aug. 7, 1984, for an "Arc Welding Gun With Gas Diffuser and External Cooling Conduit" to John G. Church and Emerson G. Malone. Another suitable welding gun and its manner of utilizing this process are disclosed in U.S. Pat. No. 4,529,863, issued Jul. 16, 1985 for "Gas-Metal-Arc Welding Method."

As mentioned above, the process generally involves depositing a weld metal upon a substrate, such as metal plates to be welded together or the like, by feeding a wire electrode endwise towards a weld deposit pool located upon the substrate. Electrical energy is passed through the electrode wire and across the arc gap between the end of the wire and the pool. This causes droplets or globules to form, one by one, on the free end of the electrode and to melt off the electrode end. The drops, as they melt off the end of the electrode, freely move or transfer across the arc gap to the pool. Meanwhile, the shielding gas surrounds the electrode end and the moving droplets or globules and provides a heated plasma field in that area.

The formation and transfer of the droplets or globules takes place rapidly. That is, a droplet forms on the end of the electrode and its connection with the electrode body portion necks-down or narrows to the point where the drop disconnects from the end of the electrode to freely fly across the arc gap. After each drop disconnects from the electrode, the next drop forms and then disconnects from the electrode. As described in my above-mentioned U.S. Pat. No. 4,866,246, a relatively high voltage and amperage is used and the wire is rapidly fed towards the arc gap so that a large amount of molten metal is deposited in the weld deposit pool.

However, it is desirable to increase the deposit rate while not adversely affecting the quality of the weld bead or the welded joint. Thus, the present invention relates to an improvement in the foregoing process by which the drops are more rapidly disconnected or melted off the end of the electrode wire and are positively projected or propelled across the arc gap to the molten metal weld pool. Consequently, the rate that drops are formed is increased.

SUMMARY OF INVENTION

This invention contemplates an improvement in the process for forming weld beads by freely transferring molten droplets or globules formed on the end of a consumable wire electrode across the arc gap to the molten metal weld deposit pool. The underlying process includes applying electrical power to the electrode and surrounding the electrode and the arc gap with a hot plasma field formed from a shielding gas mixture. The metal droplets or globules transfer from the electrode to the substrate by means of a free-flight transfer wherein the metal globules tend to move along the axis of the plasma field, co-axially with the electrode wire.

The invention contemplates reducing the time required for forming droplets on, and disconnecting the formed droplets from the free-end of the electrode wire. The disconnected droplets are positively projected or propelled across the arc gap to the weld pool in response to momentarily applying a substantially increased electrical current to the electrode when the droplet or globule is almost ready to disconnect from the electrode. That is, as each droplet is forms on the end of the electrode, it remains connected to the electrode by a necked-down portion which constricts in a cross-sectional area until it is melted through. At that point, the droplet or globule is no longer connected to the electrode end and normally moves towards the weld pool by gravity and the forces applied by from the flowing shielding gas and the plasma. Thus, this improvement involves melting-off or severing the droplet faster by the momentary application of a high electrical current to the electrode at the time that the necked-down connection between the droplet and the electrode is almost severed and the drop is almost ready to disconnect from the electrode.

The momentary increase in electrical current melts off the drop shortly before the drop would normally melt off and also coordinates with a force which tends to pinch the forming droplet free of the electrode wire. That force momentarily propels or projects the drop, in the axial direction of the electrode, towards the weld deposit pool.

It is an object of this invention to momentarily apply a short pulse of higher than normal electrical current at a time when the molten droplet or globule is partially formed and is almost ready to disconnect from the electrode. This melts off the almost fully formed droplet from the end of the electrode wire so that the droplet is positively projected towards the weld deposit pool. Between the high amperage pulses, the amperage applied to the electrode is kept at a predetermined normal level with a predetermined normal, but relatively high, voltage.

Another object of this invention is to provide a method for disconnecting a substantially formed molten droplet from the end of the weld wire electrode before the droplet would otherwise normally disconnect from the electrode, by decreasing the length of the arc gap so as to decrease the arc voltage as the droplet is formed until the voltage declines to a predetermined level which serves to trigger the application of a momentarily high amperage pulse to the electrode, following which the amperage and voltage return to their predetermined normal amounts.

Still a further object of this invention is to utilize a substantially constant, fast recovery, power supply which provides a predetermined amperage and arc gap voltage to the advancing wire electrode and which momentarily applies a substantially increased pulse of amperage to the electrode when the voltage decreases in response to the shortening of the length of the arc gap as a droplet is formed on the end of the electrode and the electrode advances towards the weld pool, following which, the predetermined amperage and arc gap voltage are restored.

Another object of this invention is to provide a process in which pulses of increased amperage are applied to the welding wire electrode periodically, that is, just before a forming droplet or globule is about to disengage from the electrode so as to prematurely melt the droplet off the electrode and assist in propelling it across the arc gap.

These and other objects and advantages of this invention will become apparent upon reading the following description, of which the attached drawings form a part.

DETAILED DESCRIPTION

Figure 1:
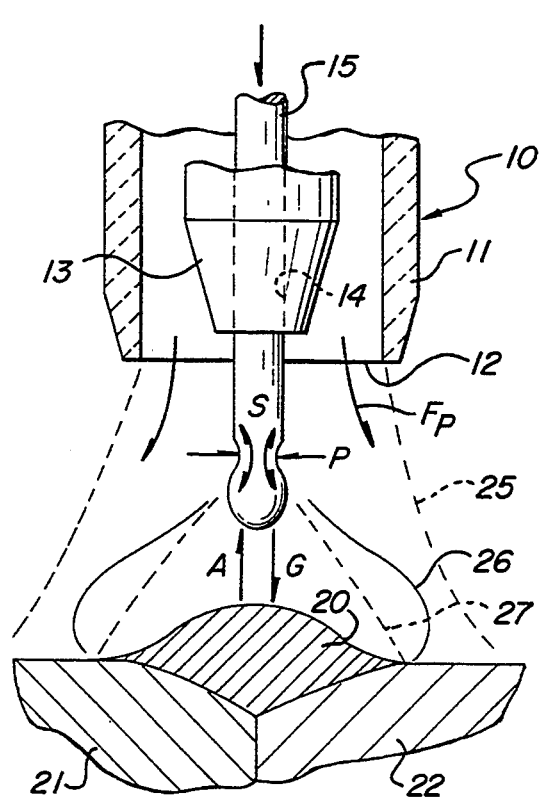
FIG. 1 is a schematic illustration of the underlying weld process, that is, the prior art process with respect to this present invention.

FIG. 1 schematically illustrates the operation of the underlying high rate deposition gas-metal-arc welding process which is described, for example, in my prior U.S. Pat. No. 4,866,246, mentioned above. The process utilizes a welding gun which is generally indicated by the number 10 which may be, for example, similar to the gun disclosed in such prior patent. However, it is contemplated that the present process may be used with other welding equipment such as automatic welding equipment. Suitable commercially available welding equipment may be selected, by those skilled in this art, for use in performing the process of this invention.

For illustration purposes, the welding gun construction and the system for applying electrical power to the welding gun as well as the system for applying the shielding gas is omitted. Thus, in schematic form, the welding gun 10, includes a ceramic sleeve 11 having a lower, open end 12. The sleeve surrounds a metal tip member 13 which is provided with a central passageway 14 through which a wire electrode 15 is continuously fed. In actual practice, the gun would also include internal parts which receive and disperse the shielding gas which is supplied through a suitable tube from a gas source.

FIG. 1 also schematically illustrates a weld deposit pool 20 which, forms a weld bead for connecting a ferrous metal substrate plate 21 to an adjacent metal substrate plate 22. The shape of the weld deposit pool is exaggerated in the drawing for illustration purposes.

As mentioned, a shielding gas is flowed through the welding gun. The gas flows downwardly and outwardly of the lower end 12 of the sleeve 11 to provide a gas flow shield 25. A plasma field 26 is formed within the gas flow and an intensely heated, inner plasma field zone 27 forms within the plasma field 26. The gas flow, the plasma field and the heated inner field plasma zone surround the end portion of the wire electrode 15 and the arc gap 30 which is located between the end of the electrode and the weld deposit pool 20. The length of the arc gap 30 is indicated by the letter "L" in step 1 of FIG. 3.

By way of background information, the shielding gas, in general, may be formed of a four-gas mixture of major proportions of helium and argon and minor proportions of carbon dioxide and oxygen. For example, the helium may be in the range of between about 25–60%, the argon may be in the range of between about 40–70%, the carbon dioxide may in the range of between 3–10%, and the oxygen may be in the range of between about 0.1–2.0% by volume. The total percentages of each of these ingredients must be sufficiently adjusted to make up the 100% volume. The percentages of each of the separate gases may be varied to meet the requirements of a particular welding job. Those skilled in the art can appropriately vary the volume of the ingredients as required. Similarly, for some welding purposes, the shielding gas may comprise less than all four of the gases mentioned above and still utilize the improvement of this invention which relates to the more expedient disconnection of the forming weld droplets and the movement of the disconnected weld droplets during the welding process.

For optimum results, the electrical current is preferably at a sufficiently high rate so that the current density is high. By way of example, utilizing an electrode wire that is 0.032 inches in diameter, such as AWOS A5.18, classification E 70 S 6 for welding a mild steel, the preferred amperage should be high enough to give approximately 700,000 amps per square inch, or roughly 550 amps. This may be utilized with a voltage in the range of between about 42–52 volts and preferably in the area of roughly 50 volts.

Figure 3:
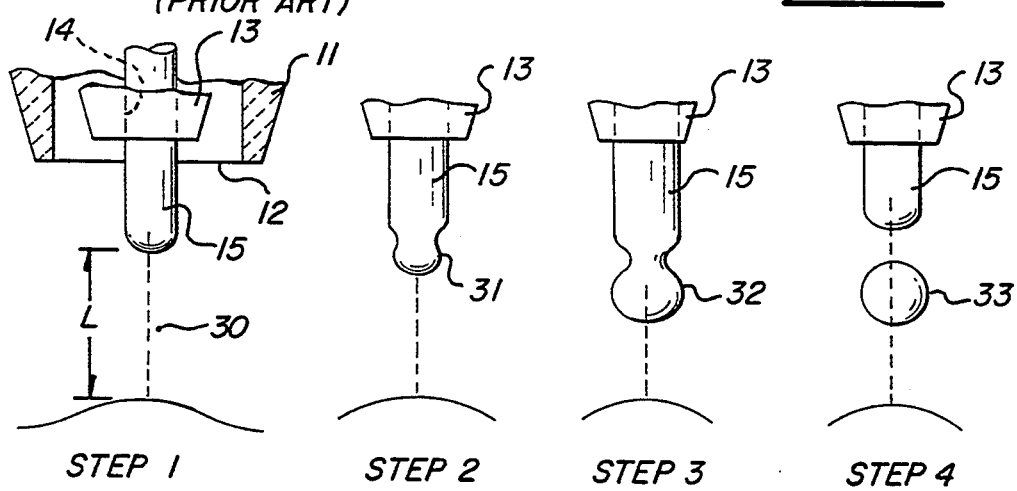
FIG. 3 is a schematic illustration of the operation of the prior art process separated into four sequential steps for illustration purposes.

Referring to FIG. 3, which schematically illustrates the prior or underlying process, the length of the "stickout" or extension of the lower end of the electrode wire is such as to provide a predetermined length are gas indicated by the letter L in step 1 of FIG. 3. The wire is advanced in its axial direction, towards the weld pool 20, at a predetermined rate of speed, as for example, in excess of 1500 inches per minute, with a melt off rate of roughly 40 pounds per hour. It should be understood that these figures are given as rough amounts for illustration purposes.

As the wire end advances toward the weld pool, a droplet or globule 31 begins to form on its end as indicated in step 2 of FIG. 3. The length of the arc gap, meanwhile, decreases because the wire continues to advance towards the weld pool while the drop forms.

Next, as shown in step 3, the droplet or globule has continued to grow and is substantially formed into the shape of a droplet 32 which is connected by a narrowed neck portion to the end of the electrode. Lastly, the narrowed neck-portion melts through so that the droplet or globule 33 is severed from the end of the electrode and is transferred by free-flight into the pool 20. The sequence then repeats to form and deposit the next drop.

Returning to FIG. 1, the droplet or globule forming on the free-end of the electrode is subjected to a number of forces. These forces are indicated by letters in FIG. 1. More specifically, the droplet is subjected to the force of the flow of the gas mixture which force is indicated by arrows labeled $F_p$. That force tends to move the droplet in the direction of the gas flow. However, the gas flow force is resisted by the surface tension forces S indicated by the curved arrows and the letter S in FIG. 1 and, also, by an arc force indicated by the letter "A." These forces resist the movement of the drop away from the electrode. Simultaneously, a radially inwardly directed force "P" pinches radially inwardly against the narrow neck-down portion which connects the drop to the electrode end. This pinch force P tends to constrict the area of the neck portion until the neck portion melts through. Lastly, the droplet tends to move downwardly to the weld pool under the influence of the force of gravity G.

In normal operation in the manner described above, the droplets tend to move along an axial line, relative to the electrode, into the weld pool as the drops are melted free of the electrode. This provides a rapid deposition of molten weld material which greatly exceeds the deposition rate of ordinary gas-arc welding.

Figure 2:
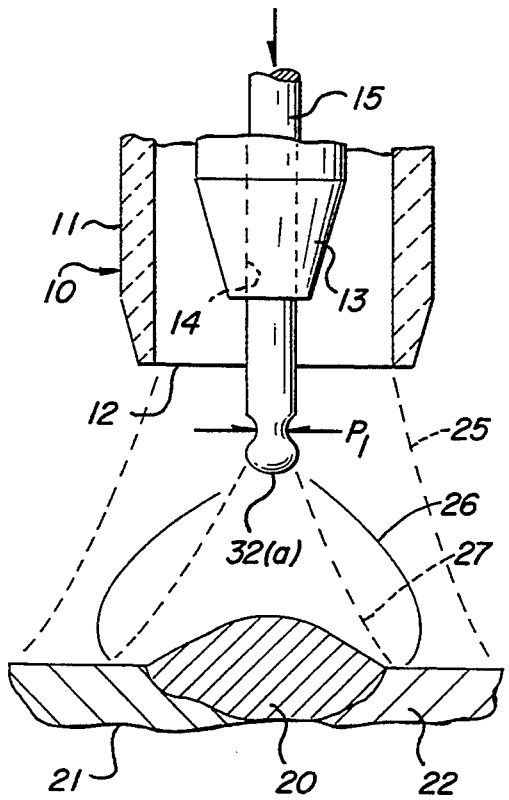
FIG. 2 is a schematic illustration of the operation of the improved process herein.

However, this invention is concerned with increasing still further the rate of deposition of the molten weld droplets or globules so as to deposit more molten metal in a shorter period of time than has been previously possible. Thus, turning to FIG. 2, which schematically explains the improvement, it can be seen that the tip member 13 is retracted within the sleeve 11 somewhat more than is illustrated in FIG. 1 and that the arc gap $L_1$ is lengthened as contrasted with the FIG. 1, prior process. Further, the droplet or globule 35 is slightly smaller than the droplet or globule shown in FIG. 1. In this case, although the droplets are somewhat smaller than the globules obtained in the prior process, they are larger than the droplets that are usually obtained in the known spray transfer welding process.

Figure 4:
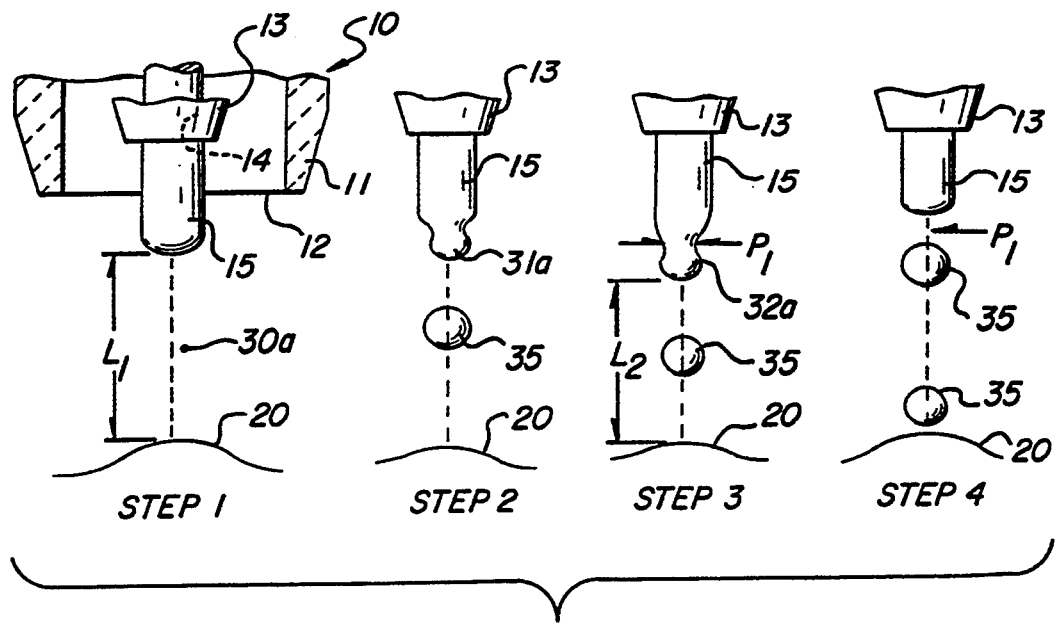
FIG. 4 is a schematic illustration of the improved method herein, similarly separated into four steps that correspond to the steps of FIG. 3.

Step 1 in FIG. 4 schematically illustrates the longer length arc gap 30a as compared with the gap of the prior process of FIG. 1. Step 2, similar to step 2 of FIG. 3, shows the formation of a droplet 31a. Next, in step 3, the droplet is more fully formed, but has not yet enlarged to the same diameter as shown in step 3 of FIG. 3. This not yet fully formed droplet 32a is almost ready to disconnect from the electrode. At this point, the electrical current flow to the electrode is substantially increased momentarily.

The momentary increase in current, increases the heating effect in the area of the neck-down connection of the droplet to the electrode so that the melt off is more rapid. Simultaneously, the pinch force $P_1$, which pinches radially inwardly at the neck connection, provides a component of force on the droplet in the axial direction. That is, the radially inwardly directed pinch force provides a force component which tends to force the droplet in the axially downwards direction. The momentary increase in amperage with its accompanying momentary increase in heating and speed of melt off, severs the droplet 32a from the end of the electrode. The axial force 20 component of the pinch force $P_1$ propels that now free droplet 35 downwardly towards the weld deposit 20.

Although the free droplets 35 are smaller than the droplets 31 in the prior process, the number of droplets can be substantially increased because the smaller droplets are released sooner, thereby enabling the more expedient formation of the next droplet. Consequently, as illustrated schematically in FIG. 4, steps 2–4, free droplets are constantly moving from the end of the electrode to the weld deposit pool as successor droplets are forming and separating from the electrode.

As mentioned above, the separation of the droplets from the electrode occurs in response to a significant increase in the current flow, in a pulse-like or momentary manner, at the time that the droplet is substantially formed and nearly ready to separate from the electrode. In order to obtain the higher, momentary amperage, the reduction in the length of the arc gap may be utilized to trigger the increased amperage. That is, the arc gap length decreases from $L_1$ to $L_2$, as shown in FIG. 4, while the droplet forms during the advancement of the electrode towards the substrate. As the arc gap length decreases, the arc voltage decreases. Consequently, a power source which provides a substantially constant power or wattage can be used provided it is of a type which rapidly recovers from the changes in amperage and voltage to a pre-determined normal level whenever the amperage or voltage momentarily deviates from their normal levels.

Figure 5:
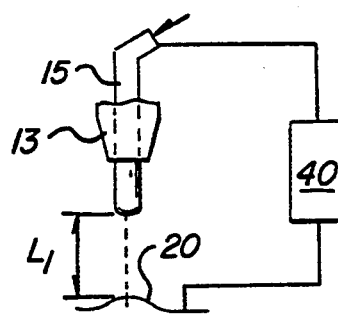
FIG. 5 is a schematic diagram showing the power source circuit in general.
Figure 6:
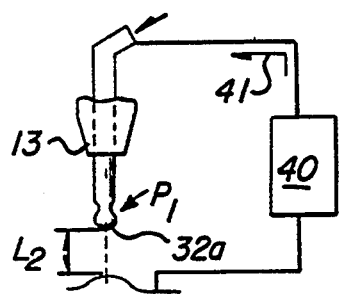
FIG. 6 is a view similar to FIG. 5 schematically illustrating the momentary application of the increased amperage.
Figure 7:
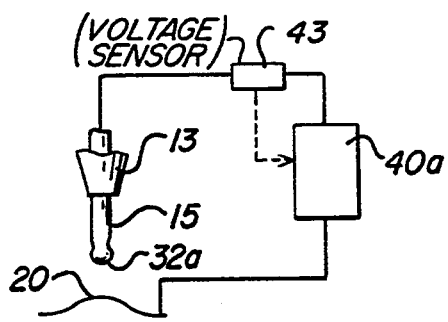
FIG. 7 is a schematic illustration showing an alternative type of power source and, FIG. 8 is a schematic illustration of another form of power source.
Figure 8:
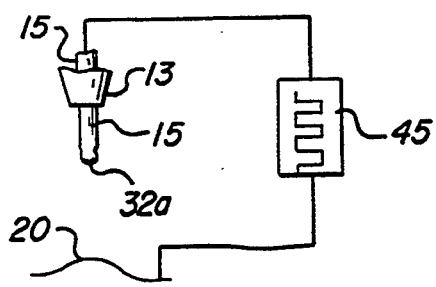

As illustrated in FIGS. 5 and 6, schematically, a commercially available power source 40 which produces a voltage in the range of roughly 60–63 volts, with an amperage sufficiently large to give a large current density, can be used. As the voltage decreases correspondingly to the shortening of the length of the arc gap, a point is reached where the voltage, in effect, causes a momentary change in the current flow to maintain the wattage levels. This momentary increase in current (see arrow 41) provides the additional amperage needed for detaching the droplet from the electrode. Following the momentary shift or increase in amperage and decrease in voltage, the substantially constant wattage power source immediately recovers and returns back to its normal voltage and amperage levels. By keying the momentary change in amperage to a voltage level which corresponds to the level $L_2$ where the droplet is partially formed as shown in step 3, the increase amperage is momentarily applied at the correct time. FIGS. 5 and 6 schematically indicate the power source 40 and the momentary increase in current by the arrow 41 (in FIG. 6). The particular level $L_2$ and voltage can be determined by those skilled in the art based upon the welding equipment used, the electrode wire used and operating conditions.

An alternative form of power source 40a can be used which includes a voltage sensing control 43 which senses the decreasing voltage in the arc gap. When a predetermined decreased voltage is sensed, the control triggers the momentary increase in amperage which almost immediately returns back to normal since the arc gap length increases immediately when the droplet is released from the end of the electrode.

Still another form of power source 45 can be used in which an increased amperage is regularly pulsated.

That is, the current regularly pulses to a high level then drops to a lower level cyclicly. The higher level of current can be timed to correspond to the time when the droplet is about is ready to release so that the amperage is regularly applied and regularly returned to normal. The timing could be set by trial and error or based upon the equipment and operating conditions that are used.

Whichever system is used for supplying the power and the momentary increase in current flow, the method contemplates that the increased current almost instantly melts off the almost formed droplet. The free droplet is propelled by the axial force component of the pinch force as well as the gravity. Meanwhile, the current returns to normal levels for the formation of the next droplet.

The particular current levels and voltage levels may be varied, depending upon the electrode material used, the shielding gases, and other factors relating to the welding. Thus, it is contemplated that the optimum momentary amperage increase amounts be determined experimentally by trial-and-error and, once determined for each particular set of conditions, utilized to produce that optimum level of droplet formation and separation which provides the increased deposition rate from the electrode to the weld deposit pool.

Although the droplets are severed from the electrode before they are as large as the droplets formed in the normal, prior process, the increase rate of formation and separation of the smaller droplets results in an overall increase in weld metal deposition. Moreover, because the droplets are slightly smaller, they have less adverse heat effect upon the weld pool. That is, they cause less melting of the substrate upon which the weld deposit is placed. Further, the smaller droplets reduce the normal undercut effect upon the substrate plate so that less time is needed for re-filling any undercut which otherwise would have been formed by the typical larger sized globules of the prior process. To summarize, the more rapid formation of the droplets and the more rapid separation of the droplet from the electrode, increases the total rate of depositing weld metal while simultaneously decreases damage or adverse effects otherwise caused by larger drops in the prior process.

This invention may be further developed within the scope of the following claims. Accordingly, it is desired that the foregoing description be read as being merely illustrative of an operative embodiment of this invention and not in a strictly limiting sense. Having fully described an operative embodiment of this invention, I now claim:

1. In a gas-metal-arc welding process which includes the steps of continuously advancing the free end of a consumable, thin wire electrode towards a weld metal deposit location at a speed which substantially maintains a predetermined length arc gap between the electrode end and the deposit location; applying a predetermined electrical voltage and current to the electrode to provide an arc across the arc gap; continuously flowing a shielding gas around the end portion of the electrode and the arc gap towards the deposit location, and maintaining a free flight transfer of a succession of drops of molten metal, formed on and separated from the free end of the electrode wire and reducing the time for the transfer of the drops from the electrode to the deposition location, comprising:

decreasing the voltage in proportion to the reduction in the length of the air gap during the formation of the drop and corresponding movement of the electrode towards the deposit location;

momentarily applying a short high current pulse of a substantially increased electrical current to the electrode at the time when each drop is partially formed and just prior to the time that the drop would have normally separated from the electrode end to momentarily melt the drop free of the electrode and consequently cause the drop to be propelled towards the deposition location;

permitting each of the drops to increase in size while forming on the end of the electrode until the juncture between the drop and the electrode necks down shortly before the droplet would normally be separated from the electrode;

applying said short high current pulse to the electrode, during the necking-down of the drop juncture, sufficiently intense to melt away the neckdown juncture and cause the drop to prematurely separate from the electrode for propelling the drop away from the electrode towards the weld location such that said drop has a diameter less than the diameter of the electrode;

restoring the initial voltage and current levels of the power to their initial levels when the drop severs from the end of the electrode in preparation for the formation of the next drop;

utilizing the forces acting upon the drop at the juncture between the drop and the electrode formed during the formation of the drop, as well as the gravitational force and the forces of the flowing gas, to propel the drop the weld deposit pool.

2. A process as defined in claim 1, and including increasing the length of said arc gap and maintaining the voltage normally in the area of about 40 volts at the start of the formation of each drop on the electrode tip.

3. A process as defined in claim 1, and including said shielding gas comprising a mixture of two or more gases selected from argon, carbon dioxide, helium and oxygen.

4. A process as defined in claim 1, and including said shielding gas comprising a mixture of between about 40–70% argon, between about 20–60% helium, between about 3–10% carbon dioxide and between about 0.1–2% oxygen, by volume, with the specific amounts of each gas adjusted to produce a 100% mixture.

* * * * *